United States Patent [19]

Okino et al.

[11] 4,160,061
[45] Jul. 3, 1979

[54] HEAT-REFLECTING GLASS PLATE AND METHOD OF PRODUCING SAME

[75] Inventors: Seiki Okino, Matsusaka; Takao Mori, Ise; Toshiharu Yanai, Matsusaka; Toshikazu Sawa, Mie, all of Japan

[73] Assignee: Central Glass Company, Limited, Ube, Japan

[21] Appl. No.: 826,126

[22] Filed: Aug. 19, 1977

Related U.S. Application Data

[63] Continuation of Ser. No. 671,550, Mar. 29, 1976, abandoned.

[30] Foreign Application Priority Data

Mar. 29, 1975 [JP] Japan ................................ 50-38144

[51] Int. Cl.² ........................ B05B 5/06; B05B 3/02; B32B 17/06
[52] U.S. Cl. ................................ 428/334; 65/60 R; 65/60 B; 65/60 D; 350/164; 350/166; 427/168; 427/169; 427/226; 427/314; 428/335; 428/432; 428/539
[58] Field of Search ............... 428/332, 336, 334, 335, 428/432, 539; 350/164, 165, 166, 1; 427/164, 165, 168, 169, 226, 229, 314, 376 R, 421, 430; 65/60 B, 60 D, 60 R

[56] References Cited

U.S. PATENT DOCUMENTS

| | | | |
|---|---|---|---|
| 3,645,778 | 2/1972 | Nesteruk | 428/432 X |
| 3,723,158 | 3/1973 | Miller | 428/432 X |
| 3,754,975 | 8/1973 | Spiller | 428/432 X |
| 3,778,243 | 12/1973 | Johnston | 65/60 B X |
| 3,811,918 | 5/1974 | Levene | 428/432 X |
| 3,850,665 | 11/1974 | Plumat et al. | 428/432 X |
| 3,934,961 | 1/1976 | Itoh et al. | 428/432 X |
| 3,984,591 | 10/1976 | Plumat et al. | 427/314 X |
| 4,022,601 | 5/1977 | Sopko | 65/60 D |

Primary Examiner—George F. Lesmes
Assistant Examiner—R. Eugene Varndell, Jr.
Attorney, Agent, or Firm—Fleit & Jacobson

[57] ABSTRACT

A glass plate coated with a metal oxide film comprising aluminum oxide and at least one of commonly used metal oxides such as the respective oxides of Cr, Co, Ni, Fe, Zn, Sn, Cu, Mn and Ti, wherein aluminum oxide is used to suppress the lowering of the reflectivity by a heat treatment of the oxide-coated glass. The oxide film is formed by coating the glass with a solution of thermally decomposable compounds exemplified by acetyl acetonates of the respective metals in an organic solvent and heating the coated solution.

4 Claims, No Drawings

HEAT-REFLECTING GLASS PLATE AND METHOD OF PRODUCING SAME

This is a continuation of appln. Ser. No. 671,550, filed Mar. 29, 1976, now abandoned.

This invention relates to a heat-reflecting glass plate and a method of producing the same.

Glass plates for use in buildings and cars are desired to be heat-reflecting, i.e., have an ability of reflecting heat rays included in the rays of sun at a satisfactory efficiency to prevent unwanted rise in the interior temperature of a building or a car and reduce the heat load on the inferior air cooling.

As is well known, a heat-reflecting glass plate is obtained by coating the surface of the glass plate with a thin and heat-reflecting film which consists of either a single metal oxide or a plurality of metal oxides such as the respective oxides of heavy metals such as Co, Cr, Ni, Fe, Sn, Mn, Ti, etc. Such a metal oxide film is formed by thermal decomposition of suitable compounds of the respective metals on the glass surface. The metal compounds are applied onto the glass surface in the form of a solution, and the decomposition is caused by heating the glass plate either before or after the application of the solution.

Conventional heat-reflecting glasses of this type have a disadvantage that they exhibit a considerable lowering in the heat-reflecting ability when the glasses are heated after the completion of the metal oxide coating. This disadvantage offers a significant problem from a practical viewpoint since a heat-reflecting glass plate frequently needs to be heated either for tempering or for bending works. As another disadvantage, conventional heat-reflecting glass plates tend to be tinged unduly thick and be unsatisfactory in transmissivity when a relatively highly concentrated solution is used for attaining a satisfactory reflectivity of the resulting metal oxide coating.

It is an object of the present invention to provide a heat-reflecting glass plate which has an improved metal oxide coating and exhibits little lowering in the reflectivity when heated after the completion of the coating.

It is another object of the invention to provide a heat-reflecting glass plate which has an improved metal oxide coating and has a paler and more reposeful tint than conventional heat-reflecting glasses of an analogous type.

It is still another object of the invention to provide a method of producing a heat-reflecting glass plate according to the invention.

According to the invention, a heat-reflecting glass plate has a metal oxide film coated at least on one side of the glass plate, and the metal oxide film comprises aluminum oxide and at least one metal oxide selected from the respective oxides of heavy metals such as Cr, Co, Ni, Fe, Zn, Sn, Cu, Mn and Ti.

The amount of aluminum oxide in the metal oxide film is preferably such that the percentage of Al to the total metals in the film is from 1 to 50% by weight, and more preferably from 5 to 35%.

According to a method of the invention for forming the metal oxide film on the glass surface, a thermally decomposable compound exemplified by acetyl acetonate of Al is dissolved in an organic solvent together with at least one similarly decomposable metal compound selected from the respective compounds of Cr, Co, Ni, Fe, Zn, Sn, Cu, Mn and Ti, and at least one side of the glass plate is coated with the solution. The coated solution is heated to cause thermal decomposition of the dissolved metal compounds to give the respective oxides.

As to the composition, a metal oxide coating formed according to the invention on a glass surface is characterized by the presence of aluminum oxide as a minor constituent. This coating consists of aluminum oxide and at least one metal oxide selected from metal oxides known as constituents of metal oxide coatings in conventional heat-reflecting glasses. The heavy metals for forming oxides in combination with Al may be used either singularly or in various combinations chosen on the same basis as in the production of conventional heat-reflecting glasses. For example, a heat-reflecting glass fitting for various uses can be obtained by the employment of either a combination of Al, Cr, Co and Fe or a combination of Al, Cr, Co, Ni and Zn.

A heat-reflecting glass needs to have an appropriate or moderate reflectivity for solar energy as a practical indication of its ability to reflect heat rays which are incident thereon. The glass becomes akin to a mirror and produces such a dazzling effect that the glass becomes unsuitable for building use if its reflectivity is excessively high. If the reflectivity is too low, of course the glass can hardly serve as a practical heat-reflecting material.

In general, the reflectivity of a heat-reflecting glass according to the invention lowers as the Al content of the metal oxide coating is increased, but the rate of lowering of the reflectivity resulting from a heat treatment of the glass after the completion of the coating can be decreased by increasing the Al content. A primary object of the invention, i.e., to prevent the lowering of the reflectivity when a heat-reflecting glass is subjected to a heat treatment such as tempering or a bending work at an elevated temperature, can be accomplished when the percentage of Al to the total metals in the metal oxide coating is from about 1 to about 50% by weight, and preferably at least about 5%. The Al content affects also the tint of the coated glass. The glass is tinged more palely as the Al content is increased.

The Al content of the metal oxide coating, therefore, is determined according to the intended use of the coated glass.

A surface of a glass plate can be coated with a thin film of metal oxides according to the invention by the application of a solution of an aluminum compound which undergoes thermal decomposition to give aluminum oxide and similar compounds of the metals selected as the other metal components of the metal oxide coating. Preferred examples of these compounds are alkoxides, acetyl acetonates, halides and nitrates. Also chelate compounds are useful. A solvent for dissolving these metal compounds should be chosen taking into consideration, other than the solubilities of the respective compounds in the solvent, its chemical stability, volatility, cost and ability of wetting the glass surface. Examples of useful solvents are alcohols such as, e.g., methanol and ethanol, aromatic solvents exemplified by benzene and toluene, dichloromethane, trichloroethane and perchloroethylene, including their mixtures.

The solution of the decomposable metal compounds is uniformly applied usually by spraying onto at least one side of a glass plate. The glass plate may be immersed into the solution when both sides of the glass plate are intended to be coated with the solution.

To cause thermal decomposition of the metal compounds contained in the coated solution and evaporate the solvent, the glass plate is heated to a temperature in the range between about 400° C. and the softening point of the glass prior to the application of the solution and thereafter is kept at this temperature. Then the metal compounds are decomposed and give oxides of the respective metals which are in intimate contact with the glass surface with a strong adhesion strength and are uniformly distributed over the glass surface.

Alternately, the solution may be applied to the glass plate which is kept at room temperature, and the coated glass plate is heated to the above described temperature after evaporation of most of the solvent so that the metal compounds may be decomposed to give oxides.

A heat-reflecting glass according to the invention is usually produced by the use of soda-lime glass, but also potash glass or quartz glass may be used. The invention is applicable to transparent, opaque or colored glass. Plate glass as the material to be coated with a metal oxide film of the invention may be a product of the Float Process.

The invention will be further illustrated by the following examples.

EXAMPLE 1

Acetyl acetonates of Cr, Co, Fe and Al were dissolved in a mixture of dichloromethane (75 Vol%) and methanol (25 Vol%) with various concentrations of aluminum acetyl acetonate as shown in the following Table 1. Each solution was sprayed onto the surface of a transparent, 30 cm square and 0.6 cm thick glass plate which had been heated to 630° C. in an electric furnace. A resulting metal oxide coating formed on the glass surface was 30 to 80 millimicrons thick. The tint of the oxide-coated glass plates was neutral and warm grayish. Light transmitted through each specimen was most thickly tinged when a reference solution containing no aluminum salt was used and became gradually pale with increase in the concentration of the aluminum salt in the solution.

After measurement of the transmissivity for visible light and reflectivity for solar energy, the oxide-coated specimens were tempered by heating again for 15 min in the electric furnace at 650° C. and rapidly chilling by a blast of compressed air. This treatment was carried out as a model of commonly practiced heat treatments of heat-reflecting glasses either for bending works or for strengthening. Then the reflectivity was measured again.

The results are presented in Table 2.

Table 1

| Sample No. | Composition of solution | | | | | Percentage of Al to total metals (Wt%) |
|---|---|---|---|---|---|---|
| | Cr Salt (g) | Co salt (g) | Fe Salt (g) | Al Salt (g) | Solvent (ml) | |
| A (Ref.) | 3.0 | 3.0 | 3.0 | 0 | 100 | 0 |
| 1 | " | " | " | 0.25 | " | 1.5 |
| 2 | " | " | " | 0.5 | " | 2.8 |
| 3 | " | " | " | 0.7 | " | 3.9 |
| 4 | " | " | " | 0.9 | " | 5.0 |
| 5 | " | " | " | 1.0 | " | 5.5 |
| 6 | " | " | " | 3.0 | " | 15.0 |
| 7 | " | " | " | 4.5 | " | 20.9 |
| 8 | " | " | " | 6.0 | " | 26.0 |
| 9 | " | " | " | 9.0 | " | 34.5 |
| 10 | " | " | " | 11.0 | " | 39.2 |
| 11 | " | " | " | 17.0 | " | 49.9 |

Table 2

| Sample No. | Percentage of Al (Wt%) | Transmissivity for visible light (%) | Reflectivity for solar energy (%) | | Lowering of reflectivity by heating (%) |
|---|---|---|---|---|---|
| | | | before heating | after heating | |
| A (Ref.) | 0 | 43.2 | 30.3 | 24.8 | 5.5 |
| 1 | 1.5 | 42.5 | 30.5 | 26.2 | 4.3 |
| 2 | 2.8 | 44.0 | 30.2 | 27.1 | 3.1 |
| 3 | 3.9 | 43.5 | 30.4 | 27.2 | 3.2 |
| 4 | 5.0 | 47.5 | 29.5 | 28.2 | 1.3 |
| 5 | 5.5 | 47.3 | 29.9 | 29.0 | 0.9 |
| 6 | 15.0 | 48.5 | 28.5 | 28.0 | 0.5 |
| 7 | 20.9 | 49.0 | 26.3 | 25.5 | 0.8 |
| 8 | 26.0 | 53.4 | 24.0 | 23.3 | 0.7 |
| 9 | 34.5 | 60.3 | 22.7 | 22.3 | 0.4 |
| 10 | 39.2 | 65.0 | 18.9 | 18.4 | 0.5 |
| 11 | 49.9 | 69.2 | 15.2 | 14.9 | 0.3 |

As seen in Table 2, the reference specimen A (which was coated with a metal oxide film not containing Al and hence was a known heat-reflecting glass) exhibited such a lowering of the reflectivity by the heat treatment that the heat-treated specimen could easily be distinguished from the untreated specimen with naked eyes. When the percentage of Al to the total metals was 5 Wt% or more, the lowering of the reflectivity was to a negligible extent. Accordingly, no poor appearance will be presented even if either a tempered glass member or a bent-formed glass member is arranged adjacent a non-treated glass member so long as both the heat-treated and non-treated members are of the same heat-reflecting glass of which metal oxide coating contains at least 5Wt% of Al(according to the above definition).

EXAMPLE 2

The solutions of acetyl acetonates and specimens of heat-reflecting glasses were prepared in the same way as in Example 1 except that the concentrations of the respective solutes were varied as shown in Table 3, and the specimens were subjected to the measurements and heat treatment in accordance with Example 1. The oxide-coated glass specimens had a neutral grayish tint. The transmitted light was most thickly tinged for the reference sample B (of which coating contained no Al) and became paler as the Al concentration in the solution was increased. When the percentage of Al to the total metals in the solution was more than 5%, the lowering of the reflectivity resulting from the heat treatment was very little and practically negligible. The experimental results are presented in Table 4.

Table 3

| Sample No. | Composition of solution | | | | | Percentage of Al to total metals (Wt%) |
|---|---|---|---|---|---|---|
| | Cr salt (g) | Co salt (g) | Fe salt (g) | Al salt (g) | Solvent (ml) | |
| B (Ref.) | 4.0 | 4.0 | 0.4 | 0 | 100 | 0 |
| 12 | " | " | " | 0.7 | 100 | 4.2 |
| 13 | " | " | " | 0.85 | " | 5.1 |
| 14 | " | " | " | 1.0 | " | 5.9 |
| 15 | " | " | " | 2.0 | " | 11.2 |
| 16 | " | " | " | 4.0 | " | 20.1 |
| 17 | " | " | " | 8.0 | " | 33.5 |
| 18 | " | " | " | 10.0 | " | 38.6 |
| 19 | " | " | " | 13.0 | " | 45.0 |

Table 4

| Sample No. | Percentage of Al (Wt%) | Transmissivity for visible light (%) | Reflectivity for solar energy (%) before heating | Reflectivity for solar energy (%) after heating | Lowering of reflectivity by heating (%) |
|---|---|---|---|---|---|
| B (Ref.) | 0 | 40.6 | 31.3 | 26.3 | 5.0 |
| 12 | 4.2 | 42.3 | 31.0 | 27.1 | 3.9 |
| 13 | 5.1 | 45.3 | 30.2 | 29.1 | 1.1 |
| 14 | 5.9 | 46.2 | 30.9 | 30.5 | 0.4 |
| 15 | 11.2 | 46.3 | 31.1 | 30.3 | 0.8 |
| 16 | 20.1 | 47.5 | 30.2 | 29.6 | 0.6 |
| 17 | 33.5 | 55.6 | 23.5 | 22.9 | 0.6 |
| 18 | 38.6 | 63.1 | 19.2 | 18.8 | 0.4 |
| 19 | 45.0 | 68.6 | 16.3 | 15.8 | 0.5 |

EXAMPLE 3

In this example, acetyl acetonates of Al, Cr, Co, Ni and Zn were used as shown in Table 5 as the essential materials for the oxide coating. The preparation of and tests with the specimens were carried out similarly to the previous examples. The thickness of the metal oxide coatings formed in this example was from about 30 to about 80 millimicrons.

The tint of transmitted light was warm and yellowish gray, and reflected images were tinged yellowish and gave an unnatural impression with a reference sample of which coating contained no Al. When Al was present, transmitted light was free from yellowish tinge, and reflected images were regarded as practically of natural color.

The lowering of the reflectivity by the heat treatment was recognizable with naked eyes for the reference sample, but became unnoticeable and practically negligible when the percentage of Al (as defined hereinbefore) was more than 5% as seen from the data in Table 6.

Table 5

| Sample No. | Cr Salt (g) | Co Salt (g) | Ni Salt (g) | Zn Salt (g) | Al Salt (g) | Solvent (ml) | Percentage of to total metals (Wt%) |
|---|---|---|---|---|---|---|---|
| C (Ref.) | 9.0 | 4.0 | 1.0 | 5.0 | 0 | 100 | 0 |
| 20 | " | " | " | " | 1.0 | " | 2.3 |
| 21 | " | " | " | " | 2.0 | " | 4.6 |
| 22 | " | " | " | " | 2.5 | " | 5.7 |
| 23 | " | " | " | " | 5.0 | " | 10.7 |
| 24 | " | " | " | " | 7.5 | " | 15.2 |
| 25 | " | " | " | " | 10.0 | " | 19.3 |
| 26 | 4.5 | 2.0 | 0.5 | 2.5 | 7.5 | " | 26.4 |
| 27 | " | " | " | " | 10.0 | " | 32.4 |
| 28 | " | " | " | " | 12.5 | " | 37.4 |

Table 6

| Sample No. | Percentage of Al (Wt%) | Transmissivity for visible light (%) | Reflectivity for solar energy (%) before heating | Reflectivity for solar energy (%) after heating | Lowering of reflectivity by heating (%) |
|---|---|---|---|---|---|
| C (Ref.) | 0 | 38.2 | 32.5 | 26.5 | 6.0 |
| 20 | 2.3 | 36.4 | 33.0 | 27.6 | 5.4 |
| 21 | 4.6 | 38.5 | 32.3 | 29.3 | 3.0 |
| 22 | 5.7 | 37.2 | 32.8 | 32.2 | 0.6 |
| 23 | 10.7 | 39.5 | 31.7 | 31.0 | 0.7 |
| 24 | 15.2 | 39.3 | 31.9 | 31.5 | 0.4 |
| 25 | 19.3 | 40.1 | 30.7 | 30.1 | 0.6 |
| 26 | 26.4 | 42.8 | 25.6 | 25.1 | 0.5 |
| 27 | 32.4 | 57.2 | 21.1 | 20.9 | 0.2 |
| 28 | 37.4 | 64.9 | 17.3 | 16.8 | 0.5 |

As illustrated by the above examples, a heat-reflecting glass according to the invention is primarily characterized by its surprisingly little and practically negligible lowering of the reflectivity when the glass is heat treated either for tempering or for bending works after the completion of the metal oxide coating. From the viewpoint of appearance, a heat-reflecting glass according to the invention has a paler and more reposeful tint than conventional heat-reflecting glasses. Besides, the presence of aluminum oxide in the metal oxide coating brings about enhancement of resistance of the glass to weather, chemicals and abrasion or adhesion strength of the coating, and such a favorable effect is heightened as the amount of aluminum oxide in the coating is increased. However, the amount of Al on the basis as defined hereinbefore is preferably limited to about 35% because of a considerable lowering of the initial reflectivity (with no heat treatment after completion of the metal oxide coating) when a larger amount of Al is present.

What is claimed is:

1. In a heat-reflecting glass plate having a metal oxide film coated on one side of the glass plate, said metal oxide film comprising the oxides of chromium, cobalt, and iron, and having a thickness ranging from about 30 to 80 millimicrons, the improvement wherein the metal oxide film, in addition to said oxides, contains aluminum oxide, the aluminum being present in an amount of from 5 to 35% by weight of the total metals contained therein, whereby a lowering of the reflectivity of the heat-reflecting glass plate for solar energy resulting from subsequent heat treatment to temper or bend the heat-reflecting glass plate is suppressed.

2. In a heat-reflecting glass plate having a metal oxide film coated on one side of the glass plate, said metal oxide film comprising the oxides of chromium, cobalt, nickel and zinc, and having a thickness ranging from about 30 to 80 millimicrons, the improvement wherein the metal oxide film, in addition to said oxides, contains aluminum oxide, the aluminum being present in an amount of from 5 to 35% by weight of the total metals contained therein, whereby a lowering of the reflectivity of the heat-reflecting glass plate resulting from subsequent heat treatment to temper or bend the heat-reflecting glass plate is suppressed.

3. In a method of producing a heat-reflecting glass plate having a metal oxide coating on one side of the glass plate comprising coating one side of the glass plate with a solution containing acetyl acetonates of chromium, cobalt, and iron dissolved in an organic solvent, heating the coated glass plate to a temperature between from about 400° to the softening point of the glass plate, thereby causing the acetyl acetonates to decompose to form a film having a thickness ranging from about 30 to about 80 millimicrons and forming oxides of chromium, cobalt, and iron, the improvement comprising: adding aluminum acetyl acetonate to the solution in such a quantity that the metal oxide film consists essentially of oxides of aluminum, chromium, cobalt, and iron, with the aluminum being present in an amount of from 5 to 35% by weight of the total metals, so as to suppress the lowering of the reflectivity of the glass plate resulting from subsequent heat treatment of the glass plate for tempering or bending thereof.

4. In a method of producing a heat-reflecting glass plate having a metal oxide coating on one side of the glass plate comprising coating one side of the glass plate with a solution containing acetyl acetonates of chromium, cobalt, nickel and zinc dissolved in an organic solvent, heating the coated glass plate to a temperature between from about 400° to the softening point of the glass plate, thereby causing the acetyl acetonates to decompose to form a film having a thickness ranging from about 30 to about 80 millimicrons and forming oxides of chromium, cobalt, and iron, the improvement comprising: adding aluminum acetyl acetonate to the solution in such a quantity that the metal oxide film consists essentially of oxides of aluminum, chromium, cobalt, nickel and zinc, with the aluminum being present in an amount of from 5 to 35% by weight of the total metals, so as to suppress the lowering of the reflectivity of the glass plate resulting from subsequent heat treatment of the glass plate for tempering or bending thereof.

* * * * *